US009865884B2

United States Patent
Kongkanand et al.

(10) Patent No.: US 9,865,884 B2
(45) Date of Patent: Jan. 9, 2018

(54) ROLL-TO-ROLL FABRICATION OF HIGH PERFORMANCE FUEL CELL ELECTRODE WITH CORE-SHELL CATALYST USING SEEDED ELECTRODES

(71) Applicant: GM GLOBAL TECHNOLOGY OPERATIONS LLC, Detroit, MI (US)

(72) Inventors: Anusorn Kongkanand, Rochester Hills, MI (US); Yun Cai, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 280 days.

(21) Appl. No.: 14/735,696

(22) Filed: Jun. 10, 2015

(65) Prior Publication Data
US 2016/0365583 A1 Dec. 15, 2016

(51) Int. Cl.
| | |
|---|---|
| *B05D 1/18* | (2006.01) |
| *C23C 18/16* | (2006.01) |
| *C23C 18/42* | (2006.01) |
| *C25D 5/48* | (2006.01) |
| *C25D 15/02* | (2006.01) |
| *H01M 4/88* | (2006.01) |
| *C25D 3/56* | (2006.01) |
| *C23C 18/54* | (2006.01) |
| *C23C 18/44* | (2006.01) |
| *C23C 18/18* | (2006.01) |
| *B05D 1/36* | (2006.01) |
| *B05D 5/00* | (2006.01) |
| *H01M 4/86* | (2006.01) |
| *H01M 4/90* | (2006.01) |
| *H01M 4/92* | (2006.01) |
| *H01M 4/96* | (2006.01) |

(52) U.S. Cl.
CPC ............ *H01M 4/8853* (2013.01); *B05D 1/36* (2013.01); *B05D 5/00* (2013.01); *C23C 18/1848* (2013.01); *C23C 18/44* (2013.01); *C23C 18/54* (2013.01); *C25D 3/562* (2013.01); *C25D 5/48* (2013.01); *C25D 15/02* (2013.01); *H01M 4/8657* (2013.01); *H01M 4/8807* (2013.01); *H01M 4/9041* (2013.01); *H01M 4/926* (2013.01); *H01M 4/928* (2013.01); *H01M 4/96* (2013.01)

(58) Field of Classification Search
CPC ............. C25D 5/48; C25D 15/02; C25D 9/02
USPC .......................... 205/255, 109, 220, 85, 138
See application file for complete search history.

(56) References Cited

U.S. PATENT DOCUMENTS

| | | | |
|---|---|---|---|
| 8,361,924 B2 * | 1/2013 | Tanaka ................. | B01J 21/18 429/400 |
| 2014/0106261 A1 * | 4/2014 | Kongkanand ....... | H01M 4/8814 429/535 |
| 2015/0372312 A1 * | 12/2015 | Atwan ................ | H01M 4/9041 429/485 |

* cited by examiner

*Primary Examiner* — Brian W Cohen
(74) *Attorney, Agent, or Firm* — Brooks Kushman P.C.

(57) ABSTRACT

A method for forming a fuel cell catalyst includes a step of forming an ionomer-containing layer including carbon particles and an ionomer. Tungsten-nickel alloy particles are formed on the carbon particles. At least a portion of the nickel in the tungsten-nickel alloy particles is replaced with palladium to form palladium-coated particles. The palladium-coated particles include a palladium shell covering the tungsten-nickel alloy particles. The palladium-coated particles are coated with platinum to form an electrode layer including core shell catalysts distributed therein.

20 Claims, 4 Drawing Sheets

US 9,865,884 B2

ROLL-TO-ROLL FABRICATION OF HIGH PERFORMANCE FUEL CELL ELECTRODE WITH CORE-SHELL CATALYST USING SEEDED ELECTRODES

TECHNICAL FIELD

In at least one embodiment, the present invention relates to fuel cell catalyst layers.

BACKGROUND

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM") to provide ion transport between the anode and cathode.

In proton exchange membrane type fuel cells, hydrogen is supplied to the anode as fuel and oxygen are supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates referred to as flow field plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The fabrication of conventional high-activity fuel cell catalysts involves depositing Pt and other metals on a carbon black support, heat treatment, acid treatment, and multiple cycles of washings, filtering, and drying. It also, in many cases, uses organic solvent, acid, or harsh chemicals which require waste management. These processes increase the cost of making the catalyst. Recently, catalysts have been made by a process involving electrodeposition of WNi nanoparticles directly onto the MPL layer of the GDL in an aqueous solution. No heat treatment or organic solvent is needed. However, although its ORR activity and stability were promising, its fuel cell performance was poor due to poor catalyst dispersion across the electrode thickness.

Accordingly, there is a need for improved methods for making highly active fuel cell catalysts.

SUMMARY

The present invention solves one or more problems of the prior art by providing, in at least one embodiment, a method for forming a fuel cell catalyst. The method includes a step of forming an ionomer-containing layer including carbon particles and an ionomer. Tungsten-nickel alloy particles are formed on the carbon particles. At least a portion of the nickel in the tungsten-nickel alloy particles is replaced with palladium to form palladium-coated particles. The palladium-coated particles include a palladium shell covering the tungsten-nickel alloy particles. The palladium-coated particles are coated with platinum to form an electrode layer including core shell catalysts distributed therein.

In another embodiment, a method for forming a fuel cell catalyst is provided. The method includes a step of forming an ionomer-containing layer including carbon particles and an ionomer. Tungsten-nickel alloy particles are electrochemically formed on the carbon particles from a solution including a nickel-containing salt and a tungsten-containing salt. At least a portion of the nickel in the tungsten-nickel alloy particles are replaced with palladium by a galvanic displacement reaction in which the tungsten-nickel alloy particles are contacted with a palladium-containing solution to form palladium-coated particles. The palladium-coated particles are coated with platinum to form an electrode layer including core shell catalysts distributed therein wherein the palladium-coated particles are coated with platinum by depositing copper on the palladium-coated particles and then replacing at least a portion of the copper with platinum.

DETAILED DESCRIPTION

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
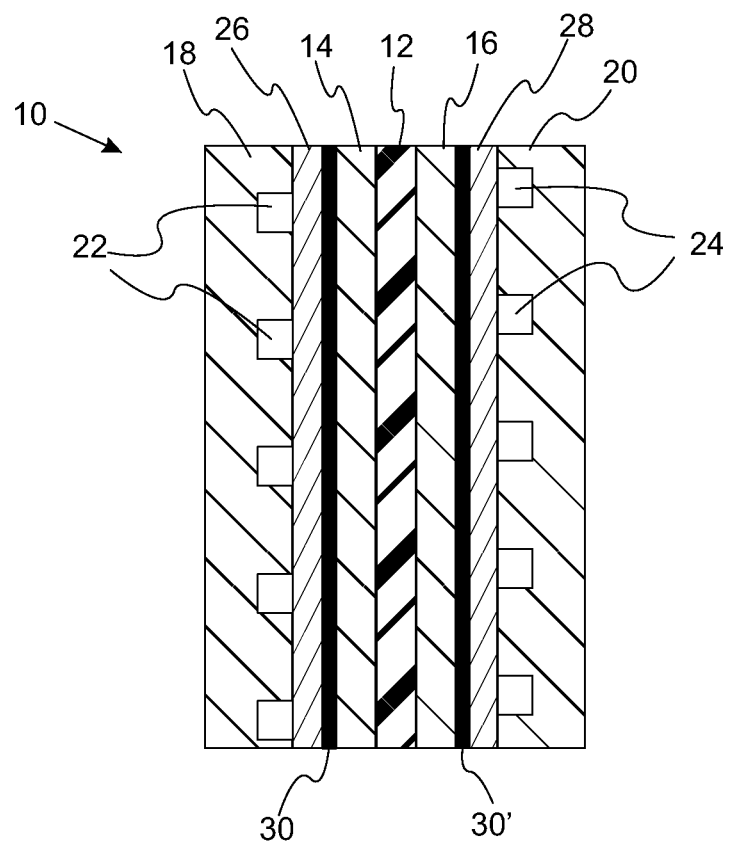
FIG. 1 provides a schematic of a fuel cell system including an embodiment of a carbon coated bipolar plate.

With reference to FIG. 1, a schematic cross section of a fuel cell that incorporates an embodiment of a grafted porous membrane is provided. Proton exchange membrane fuel cell 10 includes polymeric ion conducting membrane 12 disposed between cathode catalyst layer 14 and anode catalyst layer 16. Collectively, the combination of the ion conducting membrane 12, cathode catalyst layer 14 and anode catalyst layer 16 are a metal electrode assembly. Fuel cell 10 also includes flow field plates 18, 20, gas channels 22 and 24, and gas diffusion layers 26 and 28. Typically, gas diffusion layers 26 and 28, respectively, include microporous layers 30, 30' disposed over a face of diffusion material in the gas diffusion layers. The microporous layers 30, 30', respectively, contact cathode catalyst layer 14 and anode catalyst layer 16. In a refinement, flow field plates 18, 20 are bipolar plates. Typically, flow field plates are electrically conductive and are therefore formed from a metal such as stainless steel. In other refinements, the flow field plates are formed from an electrically conductive polymer. Advantageously, flow field plates 18, 20 are coated with a carbon coating, and in particular, a graphene-containing or carbon nanotube-containing layer coating as set forth below in more detail. Hydrogen ions that are generated by anode catalyst layer 16 migrate through polymeric ion conducting membrane 12 where they react at cathode catalyst layer 14 to form water. This electrochemical process generates an electric current through a load connected to flow field plates 18 and 20.

Figure 2A:
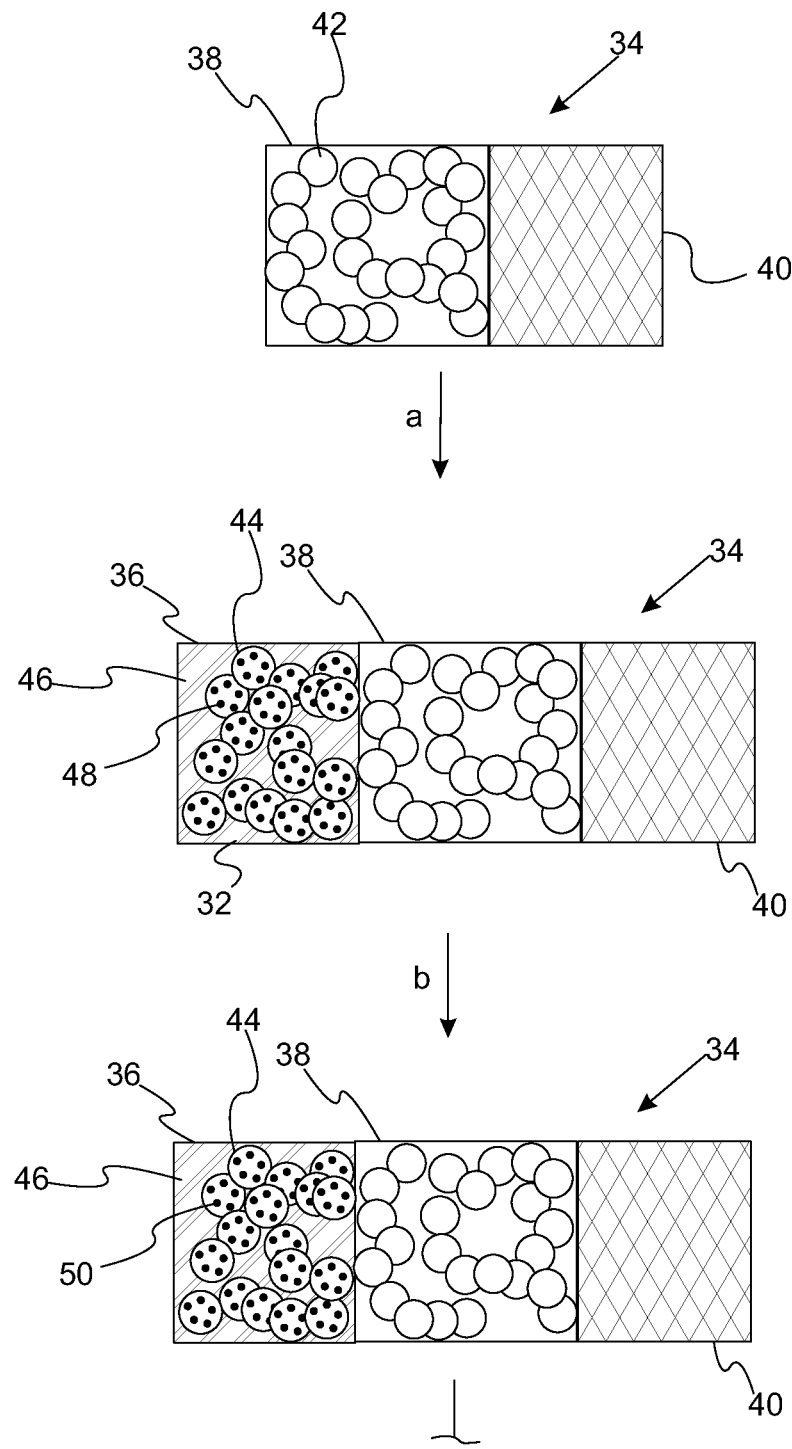
FIGS. 2A and 2B provide a schematic flowchart showing the formation of core-shell catalyst particles and their incorporation into a fuel cell.
Figure 2B:
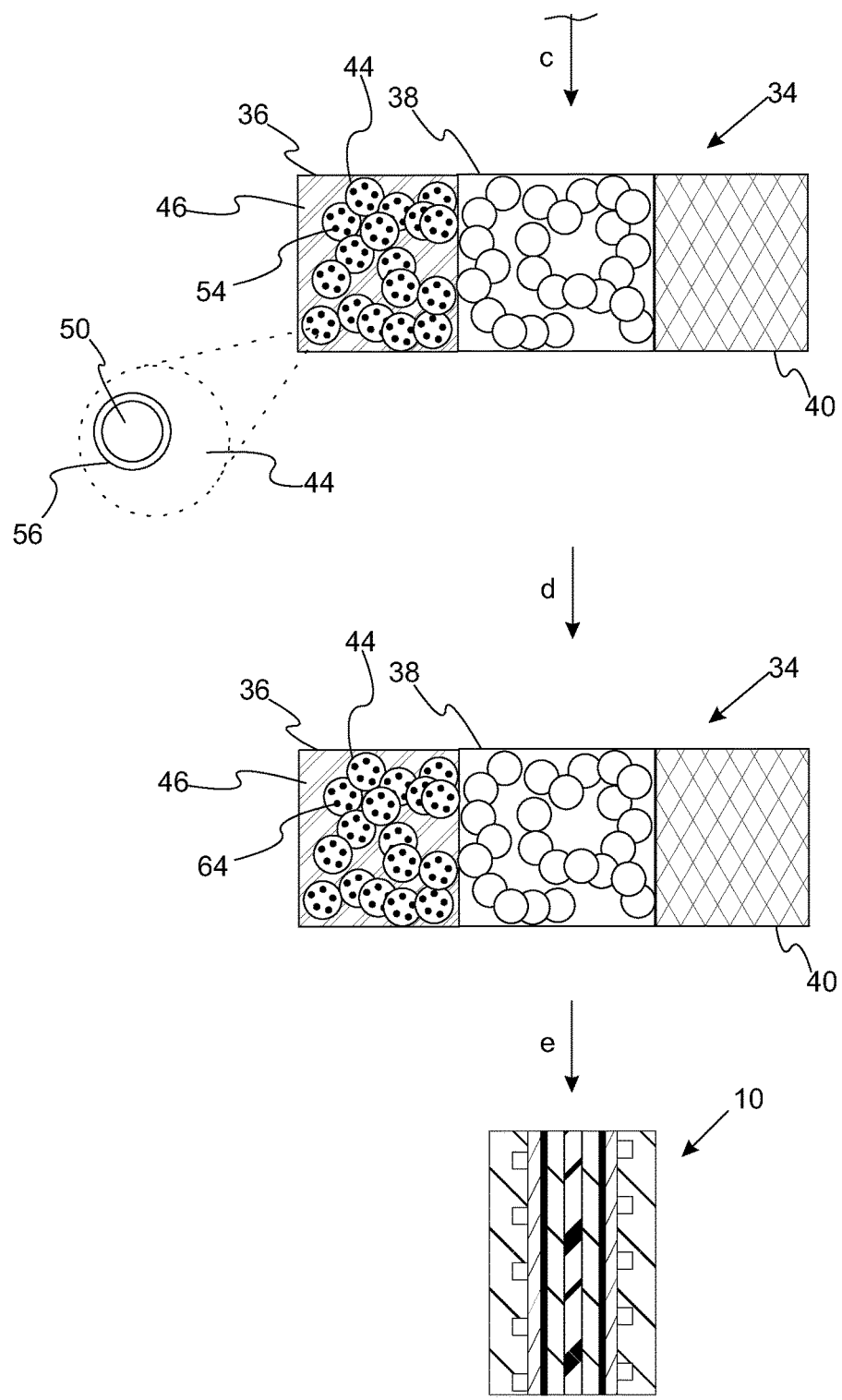

With reference to FIG. 2, a method for forming fuel cell catalysts is schematically illustrated. In step a), an ionomer-containing layer 32 is first coated onto substrate 34. For fuel cell applications, suitable substrates include gas-diffusion layers (GDLs), microporous layers, and ion exchange membranes. FIG. 2 depicts an example with ionomer-containing layer 32 coated onto microporous layer 38 which is coated onto gas diffusion material 40. Gas diffusion material can include carbon fibers and/or carbon powder held together with a binder. The gas diffusion material has a sufficient porosity which allows the reactant gases (e.g., hydrogen and air) to pass through. Microporous layer 38 may also include carbon fibers and/or carbon powder held together with a binder (e.g., TEFLON®). Typically, layer 32 is formed by coating an ink composition onto substrate 34 followed by drying. Layer 32 therefore includes ionomeric matrix 44 with carbon particles 46 dispersed therein. A slot die may be used for this coating step. Such ink compositions include an ionomer and carbon particles. Suitable carbon particles include, but are not limited to, carbon black. Examples of ionomers include, but are not limited to, perfluorosulfonic acid polymers such as NAFION®. In one variation, the carbon particles are pre-made with tungsten metal and in particular, tungsten metal particles 48 supported thereon. Typically, the thickness of layer 32 is from 3 to 20 microns. In another refinement, the thickness of layer 32 is from 8 to 15 microns or about 10 microns.

In step b), tungsten-nickel alloy particles 50 are formed on the carbon particles. When the carbon particles have been pre-formed with tungsten particles supported thereon, the tungsten particles act as seeds to promote the formation of tungsten-nickel alloy particles thereby improving dispersion of the tungsten-nickel alloy particles throughout the thickness of the layer. In a refinement, the tungsten-nickel alloy particles are formed by an electrochemical process. Typically, tungsten-nickel alloy particles are formed electrochemically from a solution including a nickel-containing salt and a tungsten-containing salt. Examples of nickel containing salts include $NiSO_4$ and $(Ni)_3(PO_4)_2$. Examples of tungsten-containing salts include metal tungstates such as $Na_2WO_4$. The tungsten-nickel alloy is electrochemically formed using a constant current or alternatively using multiple current pulses.

In step c), at least a portion of the nickel in the tungsten-nickel alloy particles 50 is replaced with palladium to form palladium-coated particles 54 such that the palladium-coated particles have a palladium shell 56 covering the tungsten-nickel alloy particles 50 supported on carbon particles 44. In a refinement, the tungsten-nickel alloy is at least partially replaced with palladium by a galvanic displacement reaction in which the tungsten-nickel alloy particles are contacted with a palladium-containing solution. Such palladium-containing solutions are formed by dissolving a palladium-containing compound (e.g., a salt) in a suitable solvent (e.g., water, alcohol, etc.).

In step d), the palladium-coated particles 54 are coated with platinum to form an electrode layer including core shell catalysts 64 distributed therein. In one variation, the palladium-coated particles are coated with platinum by depositing copper on the palladium-coated particles and then replacing at least a portion of the copper with platinum. In a refinement, the copper is electrochemically formed. In a particularly useful variation, the palladium-coated particles are coated with platinum from a solution including a platinum-containing salt and a copper containing salt. In this variation, a potential is applied to the palladium-coated particles for a first period of time (e.g., 0.5 to 2 seconds) to form the copper on the palladium-coated particles with platinum then replacing at least a portion of the copper. An open circuit is then applied for a second period of time (e.g., 30 seconds to 3 minutes or more) to allow platinum to replace copper. Step d) can be repeated several times (e.g., 3 to 5 times) to obtain a few monolayer of Pt on Pd/WNi particles. The platinum-coated particles formed in step d) are referred to as core shell catalyst particles. The platinum-coated particles can optionally be subjected to an anodic potential hold or potential cycling to dissolve excess transition metals. In step e), the particles are incorporated into a fuel cell as part of one or both of the catalyst layers.

Figure 3:
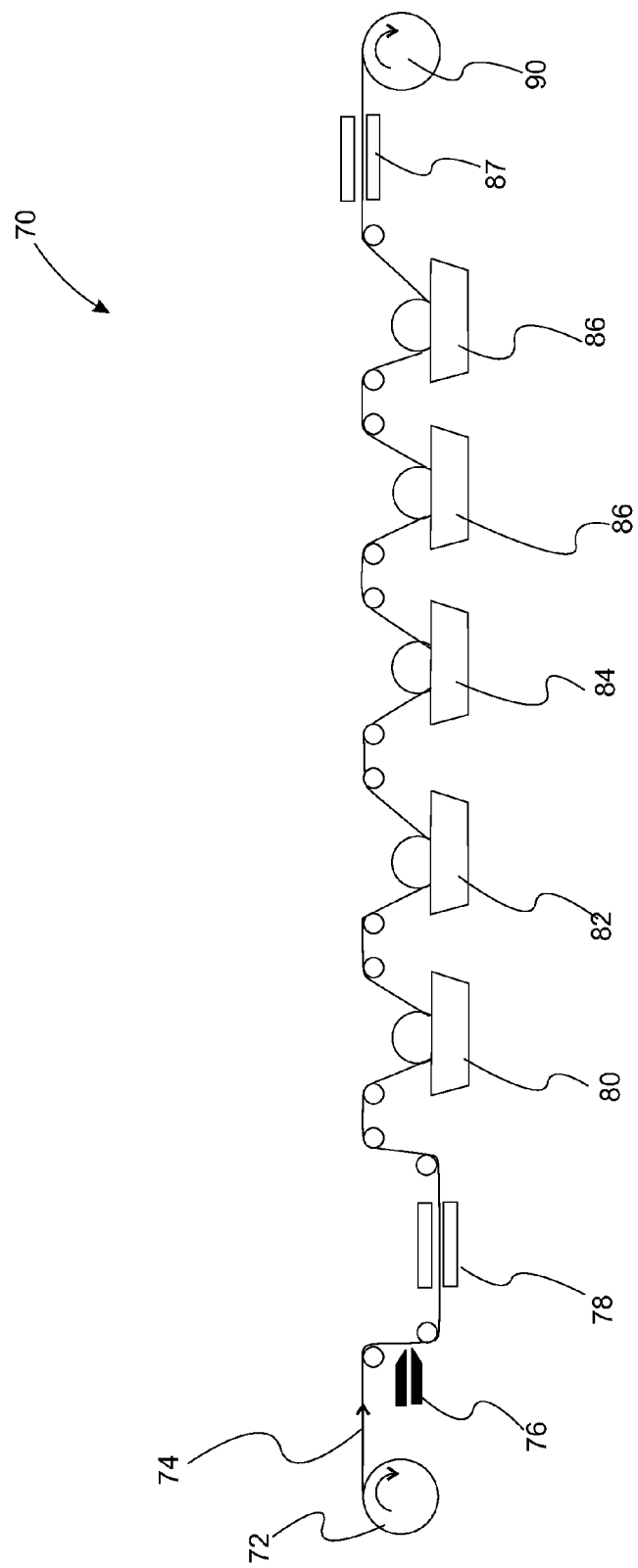
FIG. 3 provides a schematic illustration of a roll-to-roll fabrication system for forming the core shell catalyst particles.

With reference to FIGS. 2 and 3, a schematic of a roll-to-roll fabrication system for forming the core shell catalyst particles set forth above is provided. In particular, the steps a), b), c), and d) are sequentially performed in a continuous manner in the roll-to-roll system of FIG. 3. System 70 includes feed spool 72 which provides a ribbon 74 of substrate 34. Step a) is performed at station 76 where an ionomer-containing layer 32 is first coated onto substrate 34 from an ink composition as set forth above. Typically, a slot die can be used to apply the ink composition. The ribbon 74 is then provided to dryer 78 wherein the applied ink composition is dried. Ribbon 74 sequentially passes through stations 80, 82, 84, and 86. At station 80 the tungsten-nickel alloy is applied by step b) described above. At deionized water bath 82, the ribbon is rinsed. t station 84, step c) set forth above is performed. At station 86, step d) is performed. The ribbon then passes through deionized water bath 87 where the ribbon is rinsed and then drier 88. Finally, ribbon 74 is collected onto pickup spool 90. It should be appreciated that ribbon 74 moves in a continuous fashion from feed spool 72 through stations 76 to 88 to pickup spool 90.

The following examples illustrate the various embodiments of the present invention. Those skilled in the art will recognize many variations that are within the spirit of the present invention and scope of the claims.

An ionomer-containing layer is first coated on a gas-diffusion layer (GDL) by coating an ink of ionomer and pre-made W/carbon mixture onto the GDL using slot die followed by drying. The target electrode thickness is 10 micron. The coated GDL is then set into an electrochemical cell filled with a deaerated solution of 50 mM $NiSO_4$, 400 mM $Na_2WO4$, and 600 mM trisodium citrate. A cathodic constant current density of 15 mA/cm$^2$ is applied until desired deposition amount is reached determined by the coulombs/cm$^2$. This process generally takes about 5 minutes and deposits WNi alloy nanoparticles uniformly distributed across the layer thickness. Alternatively, the constant current hold can be replaced with multiple pulse deposition to improve the uniformity of the WNi deposition in the electrode. For example, a series of alternating 10 sec 15 mA/cm2 and 20 sec 1 mA/cm$^2$ can be applied. The electrolyte solution is then pumped out and the electrode rinsed multiple times with deaerated deionized water. A deaerated Pd precursor solution (1 mM $PdCl_2$+50 mM $H_2SO_4$) is then pumped into the cell. As the solution comes into contact with the WNi particles, Ni is oxidized and dissolved into the solution and Pd is reductive deposited onto the WNi particles. This reaction, also called galvanic displacement (GD), is driven by the difference in redox potential of the two metals. One could monitor the progress of this reaction by watching the open-circuit potential of the cell. As more Pd replaces Ni on the surface of WNi particles, the voltage increases. This process yields Pd shell covering the WNi core particles supported on carbon. The electrolyte solution is then pumped out and the electrode is rinsed multiple times with deaerated deionized water. A deaerated Cu and Pt precursors solution (0.1 mM $K_2PtCl_4$+50 mM $CuSO_4$+50 mM $H_2SO_4$) is then pumped into the cell. A 0.02V vs Cu/Cu$^{2+}$ electrode potential is applied for 1 sec to form a sub-monolayer of Cu on the Pd/WNi particles. The 1-sec potential hold is followed by an open circuit for 1 minute to allow Pt to replace the Cu. This process is repeated 3-5 times to obtain a monolayer of Pt on Pd/WNi particles. Optionally, the electrode may be subjected to anodic potential hold or potential cycling up to 1 V in order to dissolve excess transition metals. The completed gas-diffusion electrode (GDE) is then rinsed with deionized water and ready to be laminated against a polymer-electrolyte membrane to fabricate a membrane-electrode assembly.

An ionomer-containing layer is first coated on a gas-diffusion layer (GDL) by coating an ink of ionomer and carbon mixture onto the GDL using slot die, then let dry. The target layer thickness is 10 micron. The coated GDL is then set into an electrochemical cell filled with a deaerated solution of 50 mM $NiSO_4$, 400 mM $Na_2WO_4$, and 600 mM trisodium citrate. A cathodic constant current density of 15 mA/cm$^2$ is applied until desired deposition amount is reached determined by the C/cm$^2$. This process generally takes about 5 minutes and deposits WNi alloy nanoparticles uniformly distributing across the layer thickness. Alternatively, the constant current hold can be replaced with multiple pulse deposition to improve the uniformity of the WNi deposition in the electrode. For example, a series of alternating 10 second 15 mA/cm2and 20 sec 1 mA/cm$^2$ pulses are applied. The electrolyte solution is then pumped out and the electrode is rinsed multiple time with deaerated deionized water. A deaerated Pd precursor solution (1 mM $PdCl_2$+50 mM $H_2SO_4$) is then pumped into the cell. As the solution comes into contact with the WNi particles, Ni is oxidized and dissolved into the solution and Pd is reductive deposited onto the WNi particles. This reaction, also called galvanic displacement (GD), is driven by the difference in redox potential of the two metals. One can monitor the progress of this reaction by watching the open-circuit potential of the cell. As more Pd replaces Ni on the surface of WNi particles, the voltage increases. This process yields a Pd shell covering the WNi core particles supported on carbon. The electrolyte solution is then pumped out and the electrode is rinsed multiple times with deaerated deionized water. A deaerated Cu and Pt precursors solution (0.1 mM $K_2PtCl_4$+50 mM $CuSO_4$+50 mM $H_2SO_4$) is then pumped into the cell. A 0.02V vs Cu/Cu2+ electrode potential is applied for 1 sec to form a sub-monolayer of Cu on the Pd/WNi particles. The 1-sec potential hold is followed by an open circuit for 1 minute to allow Pt to replace the Cu. This process is repeated 3-5 times to obtain a monolayer of Pt on Pd/WNi particles. Optionally, the electrode may be subjected to anodic potential hold or potential cycling up to 1 V in order to dissolve excess transition metals. The completed gas-diffusion electrode (GDE) is then rinsed with deionized water and ready to be laminated against a polymer-electrolyte membrane to fabricate a membrane-electrode assembly.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for forming a fuel cell catalyst, the method comprising:
   a) forming an ionomer-containing layer including carbon particles and an ionomer;
   b) forming tungsten-nickel alloy particles on the carbon particles;
   c) replacing at least a portion of the nickel in the tungsten-nickel alloy particles with palladium to form palladium-coated particles, the palladium-coated particles having a palladium shell covering the tungsten-nickel alloy particles; and
   d) coating the palladium-coated particles with platinum to form an electrode layer including core shell catalysts distributed therein.

2. The method of claim 1 wherein the ionomer-containing layer is formed on a gas diffusion layer.

3. The method of claim 1 wherein the ionomer-containing layer further includes tungsten metal supported on the carbon particles.

4. The method of claim 3 wherein the tungsten metal supported on the carbon particles allows uniform tungsten-nickel alloy formation in step b).

5. The method of claim 1 wherein the tungsten-nickel alloy is electrochemically formed in step b) from a solution including a nickel-containing salt and a tungsten-containing salt.

6. The method of claim 5 wherein the nickel-containing salt is $NiSO_4$ or $(Ni)_3(PO_4)_2$.

7. The method of claim 5 wherein the tungsten-containing salt is a metal tungstate.

8. The method of claim 1 wherein the tungsten-nickel alloy is electrochemically formed using a constant current or multiple current pulses.

9. The method of claim 1 wherein steps a), b), c), and d) are sequentially performed in a continuous manner.

10. The method of claim 1 wherein the nickel in the tungsten-nickel alloy is at least partially replaced with palladium in step c) by a galvanic displacement reaction in which the tungsten-nickel alloy particles are contacted with a palladium-containing solution.

11. The method of claim 10 wherein the palladium-containing solution includes $PdCl_2$.

12. The method of claim 1 wherein the palladium-coated particles are coated with platinum by depositing copper on the palladium-coated particles and then replacing at least a portion of the copper with platinum.

13. The method of claim 12 wherein the copper is electrochemically formed.

14. The method of claim 13 wherein the palladium-coated particles are coated with platinum from a solution including a platinum-containing salt and a copper containing salt.

15. The method of claim 14 wherein a potential is applied to the palladium-coated particles for a first period of time to form the copper on the palladium-coated particles with platinum then replacing at least a portion of the copper.

16. The method of claim 15 wherein an open circuit is applied for a second period of time to allow platinum to replace copper.

17. The method of claim 15 wherein the palladium-coated particles are subjected to an anodic potential hold or potential cycling to dissolve excess transition metals.

18. The method of claim 1 further comprising incorporating the electrode layer into a fuel cell.

19. A method for forming a fuel cell catalyst, the method comprising:
   a) forming an ionomer-containing layer including carbon particles and an ionomer;
   b) electrochemically forming tungsten-nickel alloy particles on the carbon particles from a solution including a nickel-containing salt and a tungsten-containing salt;
   c) replacing at least a portion of the nickel in the tungsten-nickel alloy particles with palladium by a galvanic displacement reaction in which the tungsten-nickel alloy particles are contacted with a palladium-containing solution to form palladium-coated particles; and
   d) coating the palladium-coated particles with platinum to form an electrode layer including core shell catalysts distributed therein wherein the palladium-coated particles are coated with platinum by depositing copper on the palladium-coated particles and then replacing at least a portion of the copper with platinum.

20. The method of claim 19 wherein the nickel-containing salt is $NiSO_4$ or $(NO_3(PO_4)_2$, the tungsten-containing salt is a metal tungstate, and the palladium-containing solution includes $PdCl_2$.

* * * * *